(12) United States Patent
Perrin et al.

(10) Patent No.: US 10,524,617 B2
(45) Date of Patent: Jan. 7, 2020

(54) FOAMING DEVICE

(71) Applicant: NESTEC S.A., Vevey (CH)

(72) Inventors: Alexa Perrin, Savigny (CH); Alexandre Perentes, Sullens (CH)

(73) Assignee: Societe des Produits Nestle S.A., Vevey (CH)

( * ) Notice: Subject to any disclaimer, the term of this patent is extended or adjusted under 35 U.S.C. 154(b) by 179 days.

(21) Appl. No.: 15/560,529

(22) PCT Filed: Mar. 24, 2016

(86) PCT No.: PCT/EP2016/056638
§ 371 (c)(1),
(2) Date: Sep. 22, 2017

(87) PCT Pub. No.: WO2016/151108
PCT Pub. Date: Sep. 29, 2016

(65) Prior Publication Data
US 2018/0110371 A1    Apr. 26, 2018

(30) Foreign Application Priority Data
Feb. 5, 2015  (EP) .................................. 15160823

(51) Int. Cl.
| A47J 43/04  | (2006.01) |
| A47J 43/046 | (2006.01) |
| A01J 11/04  | (2006.01) |

(52) U.S. Cl.
CPC ........... *A47J 43/0465* (2013.01); *A01J 11/04* (2013.01); *A47J 43/046* (2013.01)

(58) Field of Classification Search
CPC .......................... A47J 43/046; A47J 43/0465
See application file for complete search history.

(56) References Cited

U.S. PATENT DOCUMENTS

| 9,801,500 | B2 * | 10/2017 | Ven Der Woning ........................ |
| | | | A47J 43/0465 |
| 2002/0196705 | A1 * | 12/2002 | Jersey ................. A47J 43/0465 |
| | | | 366/274 |

FOREIGN PATENT DOCUMENTS

| DE | 19729661   | 1/1999  |
| EP | 1656866    | 5/2006  |
| WO | 2011153587 | 12/2011 |
| WO | 2014024126 | 2/2014  |

* cited by examiner

*Primary Examiner* — Robert A Hopkins
(74) *Attorney, Agent, or Firm* — K&L Gates LLP

(57) ABSTRACT

The invention refers to a foaming device (100) for foaming and/or heating a fluid inside a container (20), the device further comprising a processing element (10), a driving unit (30) and a distinct heating unit (40) such that the processing element (10) is mechanically decoupled from both the heating unit (40) and the driving unit (30), the processing element (10) being movable inside the container (20) in response to a magnetic field generated by the driving unit (30), the processing element (10) further being inductively heatable by an oscillating magnetic field provided by the heating unit (40).

20 Claims, 3 Drawing Sheets

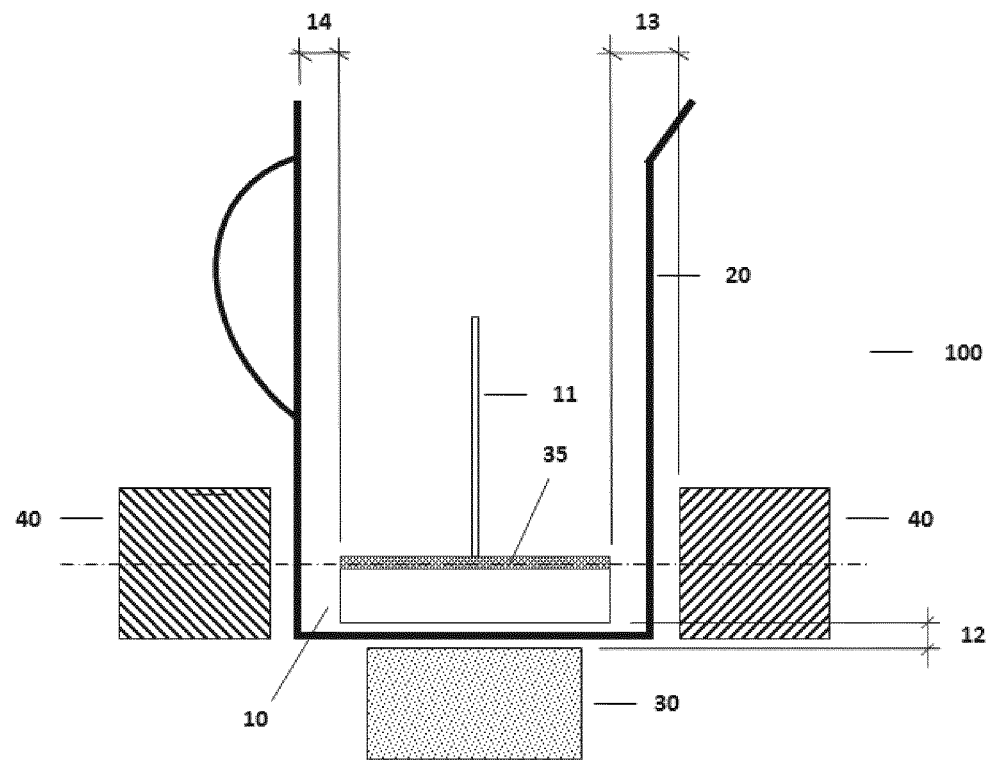
FIG. 3
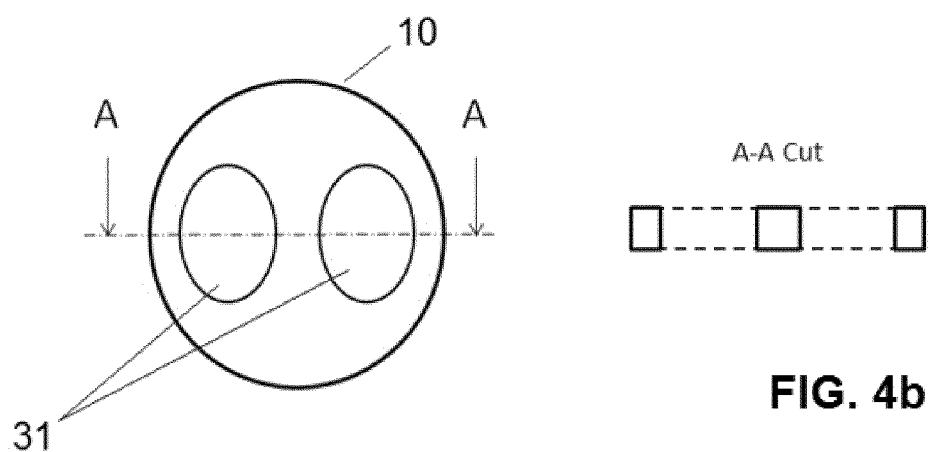
FIG. 4a
FIG. 4b

FOAMING DEVICE

CROSS REFERENCE TO RELATED APPLICATIONS

The present application is a National Stage of International Application No. PCT/EP2016/056638, filed on Mar. 24, 2016, which claims priority to European Patent Application No. 15160823.9, filed on Mar. 25, 2015, the entire contents of which are being incorporated herein by reference.

FIELD OF THE INVENTION

The present invention is directed to a foaming device and more particularly to a processing element in a foaming device able to foam and heat a foamable fluid.

BACKGROUND OF THE INVENTION

At present, there exist solutions able to provide hot foams, typically hot milk foams. These known existing solutions need to use two components: a whisk or a similar foaming element rotating within a container where milk is arranged, producing foam thanks to its rotation, and a heating element that heats the bottom part of the container and therefore heats the milk foam.

The heating element is typically configured as a thick film heater at the bottom part of the container or as an external element heating by induction this bottom part. In any of these configurations, the problem frequently arising is that there is a layer of milk being burnt on this bottom part of the container and firmly adhering to it: this presents a strong problem of hygiene and also highly complicates the cleaning of the container. Moreover, these known devices where the heating and frothing functions are separately incorporated, are more complex and more costly because of having more functional elements.

Some other solutions in the state of the art comprise steam pipes or steam venturi nozzles: these solutions are also able to froth a liquid and to heat it by using steam injection allowing heating and a specific design of the nozzle allowing frothing of the liquid. However, such solutions cannot provide a premium quality, fine and stable foam.

Document DE 20 2014 103 834 U1 discloses, for example, an immersion heating device heating a liquid arranged in a container by means of an induction plate that is introduced in the container. The most common liquid to heat with such a device is water, though no frothing would be possible with these devices either. A similar document known in the state of the art is for example US 2010/0170892 A1.

Document FR 2766048, for example, describes an electrical heating device using induction heating on an insertion element (inserted in a container where the fluid to heat is arranged) which is partly made of ferromagnetic material. This device does not allow to produce any foam and is only able to heat the fluid inside. Furthermore, it presents the problem of the fluid being burnt at the bottom part of the container and also on the insertion element itself.

There is therefore the need to provide a foaming device which is able to make hot foam on demand with a simple and compact configuration and solving the drawbacks mentioned in the state of the art, specially solving cleanability issues. The present invention is thus oriented towards these needs.

OBJECT AND SUMMARY OF THE INVENTION

According to a first aspect, the invention refers to a foaming device for foaming and/or heating a fluid inside a container, the device further comprising a processing element, a driving unit and a distinct heating unit such that the processing element is mechanically decoupled from both the heating unit and the driving unit, the processing element being movable inside the container in response to a magnetic field generated by the driving unit, the processing element further being inductively heatable by an oscillating magnetic field provided by the heating unit.

According to the invention, the foaming and/or heating provided in the fluid by the foaming device of the invention typically depends on the distance between the processing element and the driving unit and on the distance between the processing element and the heating unit.

Preferably, the driving unit and the processing element are distanced by a separating driving space of a dimension allowing that the processing element is at least partially positioned inside the magnetic field generated by the driving unit. The separating driving space is comprised between 1 and 10 mm, preferably between 1 and 6 mm and more preferably between 1 and 4 mm.

Also preferably according to the invention, the heating unit and the processing element are distanced by a separating heating space of a dimension such that the energy transfer yield is of around 50%. The separating heating space is comprised between 1 and 10 mm, preferably between 1 and 8 mm and more preferably between 1 and 6 mm.

Typically, the processing element is distanced from the inner walls of the container a distance comprised between 0.5 and 9 mm, preferably between 1 and 4 mm and more preferably, between 1 and 2 mm.

According to a preferred embodiment, the processing element of the invention comprises permanent magnetic poles interacting with either stationary magnetic windings or at least one rotating permanent magnet in the driving unit.

Typically, the processing element comprises an inductively heatable material responsive to the oscillating magnetic field from the heating unit. Preferably, the processing element further comprises a coating of a food safe material.

According to the invention, the processing element comprises at least one opening through which air is sucked towards the lower part of the processing element. Besides, the processing element typically comprises at least one disturbing element to create turbulence in the fluid.

According to one embodiment, the container of the foaming device of the invention is an open container allowing incorporation of air into the fluid for the fluid to be foamed. According to another embodiment, the container is configured as a vessel comprising an inlet through which fluid and air are introduced in the container.

Preferably, the container is made of a material such that it does not interfere with the oscillating magnetic field provided by the heating unit.

According to the invention, the foaming device further preferably comprises a control unit coupled to the driving unit and/or to the heating unit to control the intensity of the magnetic fields provided by them to the processing element.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIG. 3 shows a schematic view of the main components of the foaming device of the present invention where the container is configured as a jug, open at the upper part.

FIGS. 4a-b show a top and a cut view respectively of a processing element used in a foaming device according to the present invention.

DETAILED DESCRIPTION OF EXEMPLARY EMBODIMENTS

Figure 1:
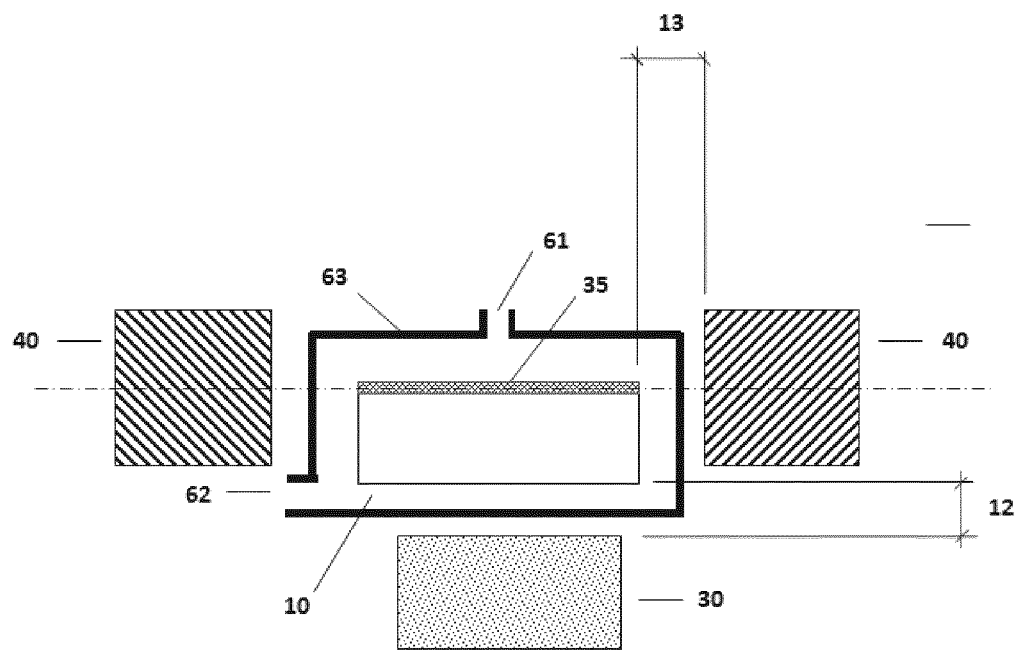
FIG. 1 shows a schematic view of the main components of the foaming device of the present invention where the heating unit is arranged on the side of the container.

The present invention discloses a foaming device 100 able to provide a hot foamed fluid departing from a foamable fluid introduced in the device; however, according to the invention, a non-heated foamed fluid can also be provided. Moreover, the foaming device 100 of the invention is configured to be removable so it can be easily cleaned.

The foaming device 100 comprises a container 20, where the foamable fluid is introduced and processed, a processing element 10 able to both foam and heat the fluid, a driving unit 30 moving the processing element 10 within the container 20 and a heating unit 40 able to heat the processing element 10, so the fluid in the container 20 is uniformly heated and foamed. Typically, according to the invention, the container 20 and the processing element 10 are arranged separately in the device 100: the driving unit 30 is able to act and move the processing element 10 without the need of mechanical contact or connection between them. As such, the processing element 10 is typically configured as a rotor, rotating within the container 20, driven by a stator, configured by the driving unit 30, rotor and stator being free from mechanical connection. Preferably, the driving unit 30 (stator) generates a magnetic field that drives the processing element 10 (rotor) within the container 20. The processing element 10 can comprise one or a plurality of blades, or it can be configured as a whisk, a brush or any other configuration able to foam a fluid by aerating it when it is moved by this processing element 10. Preferably, according to the invention, the processing element 10 and the driving unit 30 are in magnetic communication.

As shown in FIGS. 4a-b, a possible configuration of a processing element 10 is shown, configured as a whisk and comprising openings 31: these openings 31 can take several shapes and can be distributed within the processing element 10 in different ways, FIGS. 4a-b merely showing an exemplary possible execution. These openings 31 are needed to allow a circulation of air between the two faces (upper and lower) of the processing element 10 in order to avoid that a low pressure area is formed below the processing element that would generate a downward force onto the processing element 10, that would drag it towards the bottom of the container 20: by the openings 31, it is then possible to avoid this effect that would require that the driving unit 30 needs to provide a higher power in order to overcome the resistance from the processing element 10 to be moved. In fact, the openings 31 allow air to be sucked from the upper part to the lower part of the processing element 10, in order to compensate pressures on both sides (upper and lower) of the processing element 10. These openings 31 have to be large enough to allow the above-mentioned air circulation and in order to be easy to clean (if these openings are made too small, they can be more easily blocked or obstructed and it will be very difficult to clean them). Moreover, the processing element 10 preferably also comprises disturbing elements at least on one of its faces (upper and/or lower face) (not shown in the Figures) configured in different ways to allow the creation of enough turbulence: in fact, these disturbing elements create high shear stress within the fluid during the rotation of the processing element 10 in order to incorporate sufficient air to the fluid and stabilize air bubbles in it so that it is foamed. Moreover, by the use of these disturbing elements, higher quality foaming is obtained, with finer and more homogeneous air bubbles incorporated within the fluid structure. Furthermore, these openings 31 decrease the vortex effect in the processing element 10 and therefore increase its rotational speed.

The foaming device 100 also comprises a control unit (not shown) coupled to the driving unit 30 controlling the intensity of the magnetic field provided to the processing element 10. The control unit can be configured in different ways, including without limitation a micro-controller, a microprocessor, and analog and/or digital logic circuitry components or combinations thereof.

The processing element 10 is typically completely separated from the driving unit 30 and is rotatable about a processing axis 11 in response to the magnetic field of the driving unit 30. The container 20 together with the processing element 10 can be differently positioned with respect to each other, but the processing element 10 has to be located within the magnetic field created by the driving unit 30.

FIG. 3 attached shows a general view of the components in a foaming device 100 according to the invention, where a separating driving space 12 is shown separating the driving unit 30 and the processing unit 10. The processing unit 10 is moveable in response to the magnetic field generated by the driving unit 30. The separating driving space 12 needs to have a certain maximum dimension allowing sufficient intensity of magnetic field provided to the processing element 10 to originate a torque in this processing element able to overcome the resistance of the fluid circumventing the processing element 10, entraining it in rotation within said fluid. This separating driving space 12 is preferably comprised between 1 and 10 mm, more preferably between 1 and 6 mm and, even more preferably, between 1 and 4 mm. The greater magnetic interaction between the processing element 10 and the driving unit 30 enhances the rotation of the processing element 10 in response to the magnetic field generated by the driving unit 30.

The material in the separating driving space 12 can be any material having a reduced magnetic permeability, allowing higher magnetic interaction between the driving unit 30 and the processing element 10.

Preferably, according to the invention, the driving unit 30 is configured having an integrated rotor design stator comprising a plurality of stationary magnetic windings positioned to interact through the separating driving space 12 with permanent magnetic poles that are arranged in the processing element 10 (not shown in the Figures attached). Upon energization of the windings, the stator generates a magneto motive force, which drives the rotation of the processing element 10. The preferred embodiment of the invention is that with the driving unit 30 magnetically acting on the processing element 10, though other types of drives (brushless direct current drives, magnetic drives, hydraulic drives, etc.) are also possible and comprised within the scope of the invention, as long as they provide a rotation of the processing element 10 around its processing axis 11 within the fluid in the container 20. This rotation can be made with variable or constant speed. During operation, the magnetic interaction between the processing element 10 and the driving unit 30 maintains this processing element 10 in position in the container 20. Another possible embodiment according to the invention is that the driving unit comprises at least one, preferably a plurality, of rotating permanent magnets interacting through the separating driving space 12 with permanent magnetic poles in the processing element 10.

Because the processing element 10 comprises inside magnets, it will be correctly positioned with respect to the driving unit 30 within the foaming device 100, such that they can be magnetically coupled so that the magnetic field can be created and the processing element 10 can rotate. No specific alignment element is needed for this purpose.

As previously described, the processing element 10 in the foaming device 100 of the invention is also able to heat the fluid processed in the container 20 by means of a heating unit 40 heating by electrical induction the mentioned processing element 10: typically, the processing element 10 is made of an inductively responsive or heatable material being heated by eddy currents from an oscillating magnetic field provided by the heating unit 40. Typically, as represented in the Figures attached, the heating unit 40 is configured having a cylindrical shape surrounding the processing element 10. Significant electrical current is induced in the inductively responsive material of the processing element 10 when said material is subjected to a changing magnetic field, currents which, by the Joule effect, produce heat: that is to say, these are materials which are responsive to an oscillating magnetic field and dissipate the power of the field by generating caloric heat. Therefore, the processing element 10 dissipates this heat, transmitting it by thermal convection to the surrounding fluid in the container 20, even in a more efficient and homogeneous way as the processing element 10 is turning within the container 20. Besides, thanks to this rotation, it requires less timing than in the solutions known in the art.

As shown for example in the embodiment of FIG. 3, the heating unit 40 is separated a certain separating heating space 13 with respect to the processing element 10. This distance needs to be of a value such that allows sufficient electrical current being induced in the processing element 10, so that enough heat can be dissipated consequently into the fluid. Preferably, this separating heating space 13 is comprised between 1 and 10 mm, more preferably between 1 and 8 mm and, even more preferably, between 1 and 6 mm.

Preferably, according to the invention, the control unit is also coupled to the heating unit 40 in order to control the power of the oscillating magnetic field provided to the processing element 10. As described previously, the control unit can be configured in different ways, including without limitation a micro-controller, a microprocessor, and analog and/or digital logic circuitry components or combinations thereof.

These inductively responsive materials include without limitation iron, cast iron, steel, carbon steel, stainless steel, martensitic stainless steel, cobalt steel, chrome steel, nickel steel, silicon steel, magnetic stainless steel, spring steel, mu-metal, their alloys and their combinations. Other possible materials are aluminum, copper and their alloys.

The heating unit 40 used in the device of the invention is an induction heating unit, comprising a power supply, typically with provisions for rectifying and filtering an AC voltage, and an inverter for supplying a variable current to an inductive coil.

As shown in FIG. 3, there is a certain distance, inner processing space 14, between the inner walls of the container 20 and the processing element 10: this distance needs also to be maintained within certain values in order to allow the above-mentioned air circulation allowing the pressure compensation. Moreover, the processing element 10 needs to keep a certain minimum distance within the inner walls of the container to allow its rotation. This inner processing space 14 is preferably comprised between 0.5 and 9 mm, more preferably between 1 and 4 mm and, even more preferably, between 1 and 2 mm.

Figures 5A, 5B, 5C:
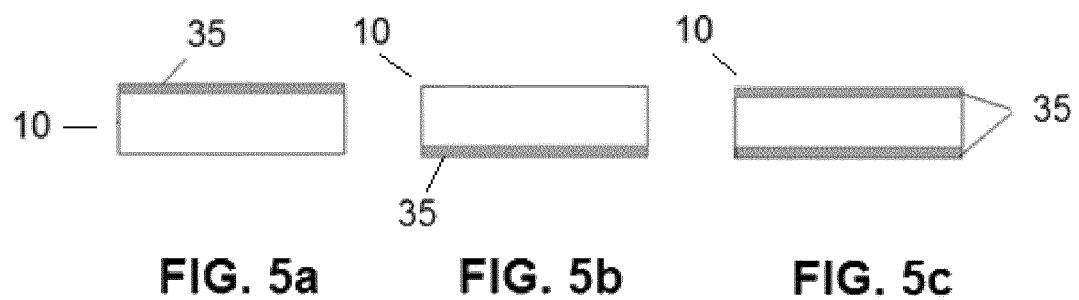
FIGS. 5a-b-c show schematic views of possible arrangements of a heating plate in a processing element in the foaming device of the present invention.

Typically, the processing element 10 comprises a heating plate 35 made of an inductively responsive or heatable material chosen such that sufficient electrical current (eddy currents) flow in the material and produce dissipation, these currents being associated with induced voltages developed in the material by the application of a changing magnetic field. The preferred material for the heating plate 35 is ferromagnetic stainless steel. Also, the processing element 10 comprises a composite material which wraps the rest of its surface (leaving the heating plate 35 free from this composite so the heating plate 35 is actually the part of the processing element 10 being heated and transmitting heat to the surrounding fluid). The processing element 10 further comprises magnets arranged in such a way that they are completely covered and protected. Over the whole external structure of the processing element 10, a thin food safe coating is provided, preferably made of a non-wetting and non-sticking (non-adherent) material. Different arrangements of the heating plate 35 are possible, as shown in FIG. 5a, 5b or 5c, FIG. 5c showing for example a configuration with two heating plates. Typically, the heating plate 35 is made of a thickness comprised between 0, 5 and 1 mm, enough to effectively heat the fluid and not too big to make the processing element light as it is turned within the container 20.

The foaming device 100 of the invention can be used to produce hot foams from a fluid in the container 20, though it can also produce cold foams from such fluid simply by using the device without the heating unit 40 being on. This provides a further important advantage of the present invention, as the heating capability can be disconnected so the performance of the device is optimized, the power being used specifically for the function targeted. Typically, the foaming device 100 of the invention is used in kitchen appliances, though other uses and applications are possible and would be also covered by the scope of the present invention.

As already explained before, the container 20 in the present invention is not a technical part as it is the case in the executions known in the state of the art. The container in the known prior art typically needs to comprise a heating plate which heats the fluid inside the container, so it is in fact a technical part of the system. On the contrary, in the device of the invention, the container 20 is not a technical part of the system, so it can be configured in a very simple way, can be used for example as the drinking container, or it can be washed in a dishwasher, for example. Furthermore, as the processing element 10 and the container are functionally decoupled, the heating being made by the processing element 10, no burnt fluid remains at the bottom of the container, as it is the case in the prior art, so a very easy cleaning of the container is possible. Moreover, the container in the prior art is typically made of a material having high conductivity, typically a metallic material. However, according to the present invention, the container 20 is not made of a ferromagnetic material in order not to be heated by the heating unit 40; therefore it is made of a material that does not interfere with the oscillating magnetic field provided by the heating unit 40 creating the eddy currents in the processing element 10. Typically, the container 20 is made of glass or plastics, though other materials can also be used.

Another important advantage of the foaming device of the invention is that, because it is the processing element 10 the element of the device which foams and heats at the same time, while rotating inside the container 20, the heating time needed for the fluid is reduced and, besides, cleanability is highly enhanced as there are no sticking parts for the fluid (typically being burnt also) in the device. Also, as already discussed, a more homogeneous heating of the fluid is also obtained.

Because the heating unit 40 is separated from the processing element 10, as shown in FIG. 3 for example, the effective heating power provided to the processing element 10 is actually reduced by average around 50%, so if the heating unit 40 gives 400 Watt, only around 200 Watt will actually reach the processing element 10. For this reason, by taking into account this factor, the design of the heating unit 40 is done accordingly.

Preferably, according to the invention, the processing element 10 is mechanically decoupled from the driving unit 30 (they are magnetically coupled once arranged in the device) which makes the configuration simple. However, also according to the invention, the driving unit 30 can also be mechanically coupled to the processing element 10, driving it.

Typically, in the device of the invention, the processing element 10 is heated by induction by means of the heating unit 40 and it also acts as a brushless flat motor.

According to the invention, different executions of the foaming device 100 of the invention are possible: the processing element 10 can be configured as a whisk, which will be introduced in a container 20, and will be made rotate by means of the driving unit 30, being also heated by means of the heating unit 40, as schematically represented in FIG. 3.

Figure 2:
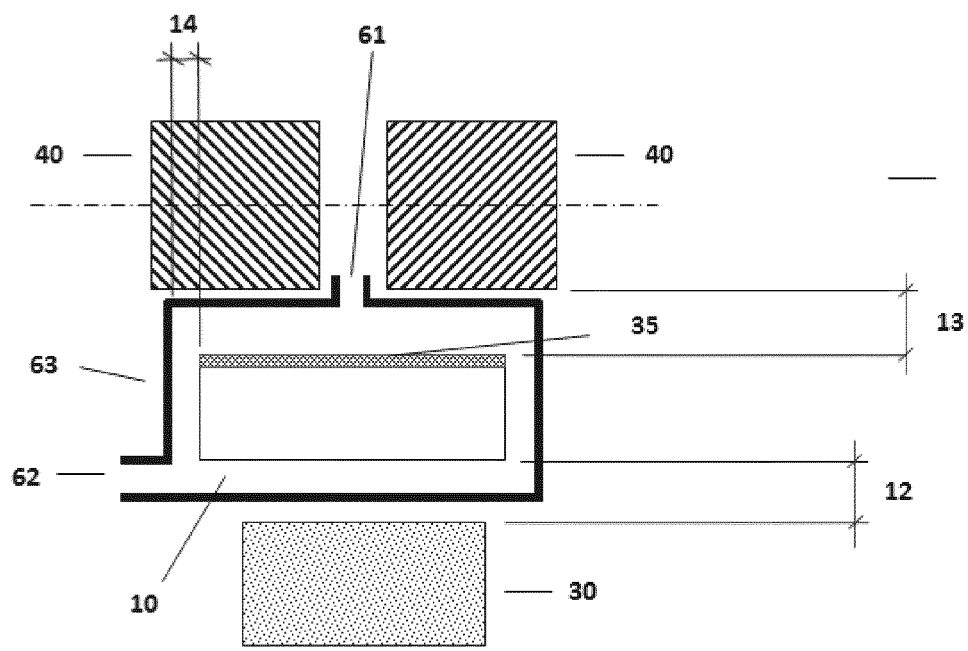
FIG. 2 shows a schematic view of the main components of the foaming device of the present invention where the heating unit is arranged on top of the container.

Different arrangements or positionings of the heating unit 40 according to the present invention are possible:
 it can be arranged on one lateral side of the container 20, preferably as a sleeve around the lower bottom part of the container 20, when this container is cylindrically shaped (see any of FIG. 1 or 3);
 it can be arranged on the upper part of the container 20 (see FIG. 2).

However, other arrangements of the heating unit 40 are possible and would also be comprised within the scope of the present invention.

Preferably, the container 20 is configured as a jug, being open on its upper side, through where the processing element 10 will be introduced, as shown for example in FIG. 3.

According to a different embodiment, as shown for example in FIGS. 1-2, the container 20 is configured as a closed vessel 63 or chamber which is integrated in a device 100. In this case, the processing element (also preferably configured as a whisk) turns inside a closed chamber where a fluid is arranged. In this case, air is preferably incorporated to the flow of fluid through an inlet before the fluid inlet 61 where fluid together with air are introduced in this closed chamber: once the fluid has been foamed and (optionally) heated, it is delivered through a foam outlet 62, as shown in FIGS. 1-2. The heating unit 40 and the driving unit 30 are arranged externally this closed vessel 63 or chamber where the fluid and the processing element 10 are arranged. For the rest, the system works in the same way as it works for the open jug-type container 20 shown in FIG. 3.

Although the present invention has been described with reference to preferred embodiments thereof, many modifications and alternations may be made by a person having ordinary skill in the art without departing from the scope of this invention which is defined by the appended claims.

The invention claimed is:

1. A foaming device for foaming and/or heating a fluid inside a container, the foaming device comprising a processing element, a driving unit, and a distinct heating unit, wherein the processing element is mechanically decoupled from both the distinct heating unit and the driving unit, wherein the processing element is movable inside the container in response to a magnetic field generated by the driving unit, and wherein the processing element is inductively heatable by an oscillating magnetic field provided by the distinct heating unit.

2. The foaming device according to claim 1 wherein the foaming and/or the heating of the fluid depends on a distance between the processing element and the driving unit and/or on a distance between the processing element and the distinct heating unit.

3. The foaming device according to claim 1 wherein the driving unit and the processing element are distanced by a separating driving space of a dimension configured for the processing element to be at least partially positioned inside the magnetic field generated by the driving unit.

4. The foaming device according to claim 3 wherein the separating driving space is between 1 and 10 mm.

5. The foaming device according to claim 1 wherein the distinct heating unit and the processing element are distanced by a separating heating space of a dimension such that the energy transfer yield is around 50%.

6. The foaming device according to claim 5 wherein the separating heating space is between 1 and 10 mm.

7. The foaming device according to claim 1 wherein the processing element is distanced from inner walls of the container at a distance between 0.5 and 9 mm.

8. The foaming device according to claim 1 wherein the processing element comprises permanent magnetic poles interacting with either stationary magnetic windings or at least one rotating permanent magnet in the driving unit.

9. The foaming device according to claim 1 wherein the processing element comprises an inductively heatable material responsive to the oscillating magnetic field from the distinct heating unit.

10. The foaming device according to claim 9 wherein the processing element comprises a coating comprising a food safe material.

11. The foaming device according to claim 1 wherein the processing element comprises at least one opening through which air is sucked towards a lower part of the processing element.

12. The foaming device according to claim 1 wherein the processing element comprises at least one disturbing element configured to create turbulence in the fluid.

13. The foaming device according to claim 1 wherein the container is an open container configured for incorporation of air into the fluid for the fluid to be foamed.

14. The foaming device according to claim 1 wherein the container is configured as a vessel comprising an inlet through which the fluid and air are introduced in the container.

15. The foaming device according to claim 1 wherein the container is made of a material such that the container does not interfere with the oscillating magnetic field provided by the distinct heating unit.

16. The foaming device according to claim 1 comprising a control unit coupled to at least one component selected from the group consisting of the driving unit and the distinct heating unit to control the intensity of the magnetic fields provided by the at least one component to the processing element.

17. The foaming device according to claim 1 wherein the processing element is a whisk comprising openings between an upper face and a lower face of the processing element.

18. The foaming device according to claim 1 wherein the processing element comprises a heating plate comprising an inductively responsive or inductively heatable material, and the processing element further comprises a composite material covering a portion of a surface of the processing element.

19. The foaming device according to claim 1 wherein the processing element comprises one or more blades.

20. The foaming device according to claim 1 wherein the distinct heating unit is arranged on a lateral side of the container as a sleeve around a lower bottom part of the container.

* * * * *